Jan. 2, 1940.  C. F. BURGESS  2,185,829
BATTERY
Filed Aug. 1, 1936    3 Sheets-Sheet 1

Inventor:
Charles F. Burgess

Jan. 2, 1940. C. F. BURGESS 2,185,829
BATTERY
Filed Aug. 1, 1936 3 Sheets-Sheet 2
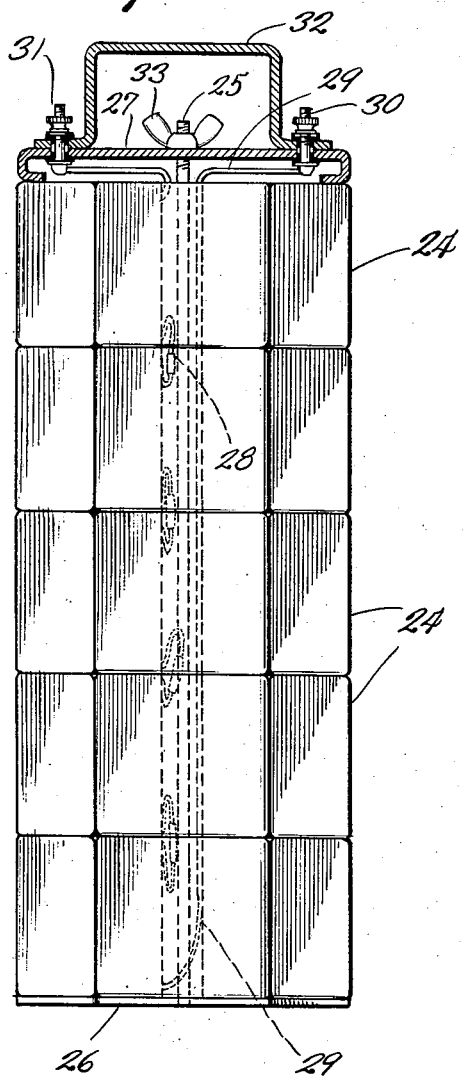
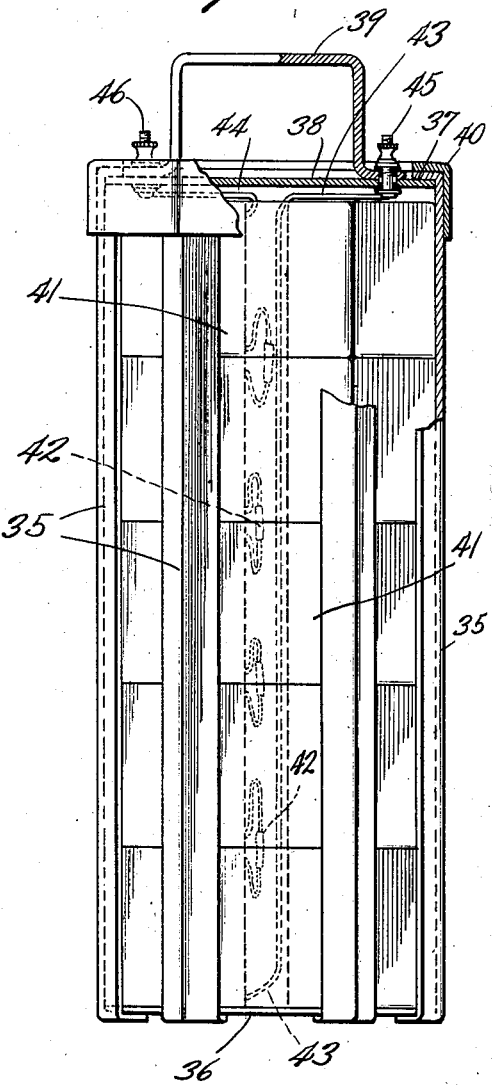
Inventor:
Charles F. Burgess
By N. J. Tesch
atty.

Jan. 2, 1940.   C. F. BURGESS   2,185,829
BATTERY
Filed Aug. 1, 1936   3 Sheets-Sheet 3

Inventor:
Charles F. Burgess
By W. J. Jesch
Atty.

Patented Jan. 2, 1940

2,185,829

UNITED STATES PATENT OFFICE 2,185,829

BATTERY

Charles F. Burgess, Bokeelia, Fla., assignor, by mesne assignments, to Burgess Battery Company, Chicago, Ill., a corporation of Delaware Application August 1, 1936, Serial No. 93,755

5 Claims. (Cl. 136—108)

This invention relates to multiple cell batteries, and particularly batteries in which the cells are connected in parallel, although it is not limited thereto. It relates to batteries of the low voltage, high capacity type which are particularly adapted for lighting service, such as the lighting of beacons for railroads, lighthouses, coast guard equipment, airport field marking equipment, etc. The batteries are also adapted for use in operating neon signs as in Patent No. 2,029,221. In general, they are adapted for use under any conditions where low voltage heavy drain requirements are found.

It is the object of the invention to provide a battery of the type described which is sturdy and compact and which may be connected readily to other batteries of the same type.

It is a further object of the invention to provide a battery of the type described which is adapted to receive retaining means whereby it may be held in any desired location and whereby a number of the batteries may be arranged together in permanent relation under conditions where a multiple battery installation is desired.

In the drawings:

Fig. 3 is a side view, partly in section, of an arrangement in which a number of the batteries are arranged and held together by one form of retaining means;

Fig. 4 is a side view, with a portion broken away, showing an arrangement similar to that of Fig. 3 in which a different retaining means is employed.

Figure 2:
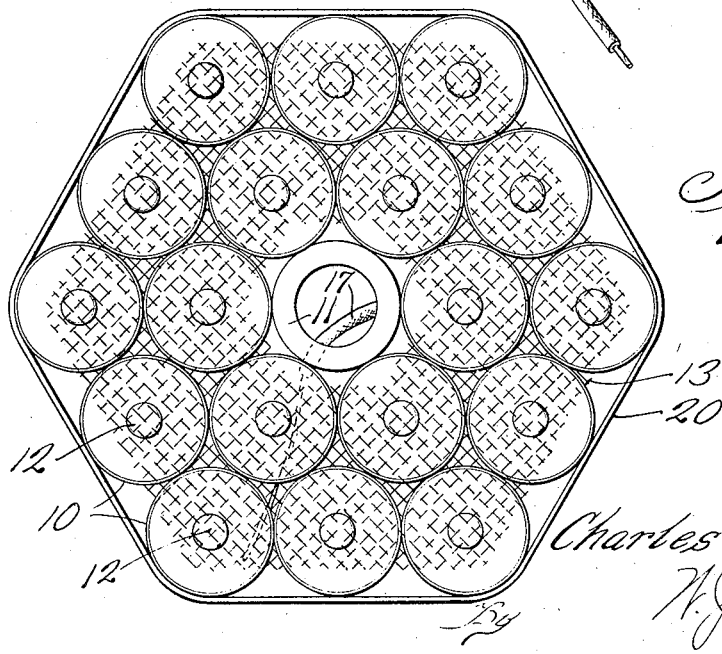
Fig. 2 is a top plan view of the battery taken at the level of the tops of the containers of the cells of Fig. 1.

The battery comprises a plurality of cylindrical dry cells 10 arranged in close packed arrangement, as shown in Fig. 2. The dry cells have the ordinary cylindrical zinc containers and preferably are in direct contact with one another whereby they occupy as small a space as possible. The cells may have the usual cylindrical insulating jackets if desired.

The dry cells of Fig. 2 are shown to be arranged in a hexagonal group. The cell which would occur in the center of the group is omitted and an open ended tube 11 of insulating material is used in its place. The dry cells 10 are provided with the usual brass capped central positive electrode 12 projecting from the top thereof. The bottoms of the zinc cans of dry cells 10 are connected together by means of a metallic screen 13 of hexagonal shape to conform with the shape of the group of cells and a second similarly shaped wire screen 14 is connected to the central terminals 12. A relatively thick sheet or board of insulating material 15, having openings to accommodate the central terminals 12, is arranged between screen 14 and the top edges of the zinc cans. The dry cells 10 and the tube 11 may be placed in a container or a jig which holds the group firmly together with the bottoms of the dry cells exposed, and the screen 13 may be placed upon the exposed ends of the dry cells and soldered to each of them. The group is then reversed so that the central terminals of the dry cells are exposed and the sheet of insulating material 15 is fitted over the central terminals 12 so that the latter are exposed through the openings in the sheet. The screen 14 is then placed over the exposed terminals 12 and soldered to them. The insulating sheet 15 protects against possible short circuits between screen 14 and the tops of the zinc cans. The ends of tube 11 extend beyond wire screens 13 and 14 and central openings are provided in the screens and in insulating sheet 15 to accommodate the tube. Terminal wire 17 is connected to the bottom screen 13 and a second terminal wire 18 is similarly connected to the top screen 14. These terminal wires are adapted to be connected to a cooperating external circuit or to the terminal wire of additional batteries in case it is desired to use several of the batteries connected in series or parallel.

The assembly described is encased in a container 20 of insulating material, which container is provided with substantially flat bottom and top members 21 and 22. The bottom and top members are provided with central openings which coincide with tube 11. The ends of tube 11 may be attached to bottom and top members 21 and 22 by means of adhesive, or metal staples, or any other suitable means. The end portions of terminal wires 17 and 18 are arranged within tube 11 and notches or openings may be provided at the ends of the tubes for the terminal wires to pass through beneath the end covers 21 and 22. After the battery has been assembled it may be dipped in a suitable compound for imparting resistance to moisture, salt water, oil and other liquids with which it is likely to come in contact during use. A vinyl acetate resin has been found to be suitable for the purpose and the battery may be dipped in a solution thereof in a suitable solvent, such as acetone. The battery may also be protected by wrapping it in paper which is resistant to moisture and other liquids.

Figure 1:
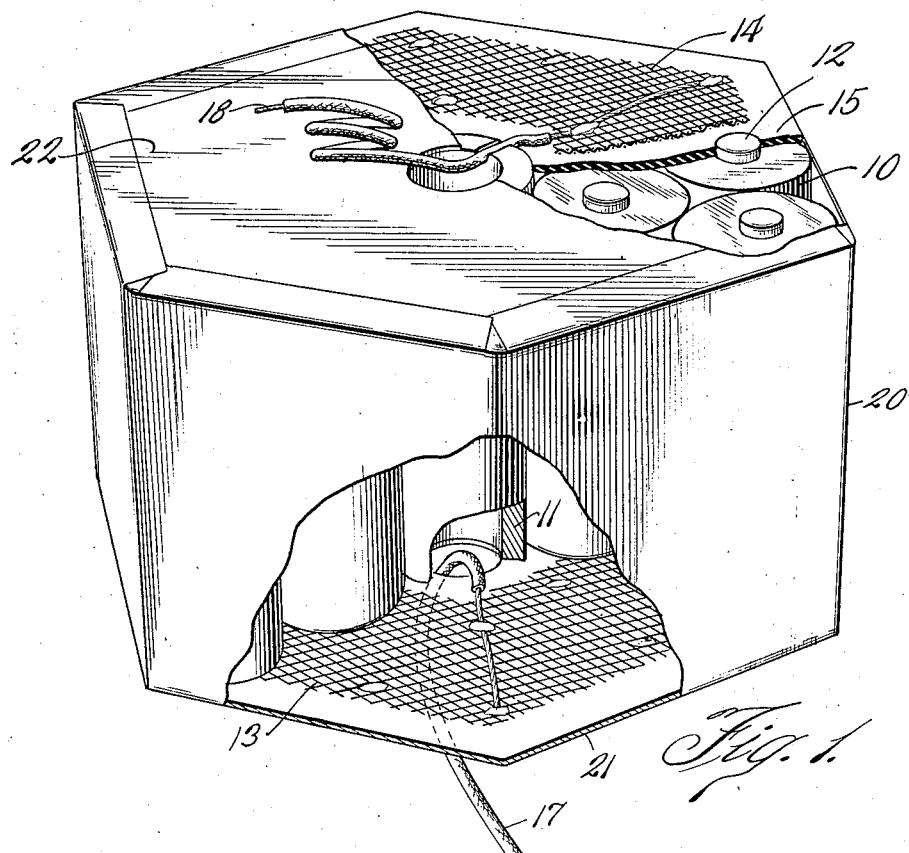
Fig. 1 is a perspective view of the battery of this invention with portions broken away and removed to show the internal construction.

The close packed arrangement and parallel connection of the cells of the battery of Fig. 1 is the subject of C. F. Burgess Patent 2,014,832 granted September 17, 1935, and while it is particularly useful in batteries adapted for the types of service mentioned heretofore, the present invention is not limited to such arrangement and connection. The cells may be arranged in the well-known egg crate construction and may be connected in series to provide a high voltage battery. Other variations in the construction of the battery may be made in accordance with well-known practice.

Fig. 3 illustrates an arrangement in which a plurality of the batteries 24 are supported together upon a supporting means comprising a rod 25 with a bottom plate 26 and a top plate 27 attached to the ends thereof. The bottom terminal wire of the top battery is connected to the top terminal wire of the second battery and a similar connection is repeated between the second battery and the one beneath it, etc., these connections being indicated at 28 and providing a series connection of the several batteries. Rod 25 threads the central tubes of the batteries and maintains them in their relative positions. The tubes are larger than the rod and the bottom terminal wire of the bottom battery is connected to a wire 29 which is brought up through the tubes to the terminal 30, which is mounted on top plate 27. The top terminal wire of the top battery is connected to a second terminal 31, which also is mounted on plate 27. A handle 32 is mounted on plate 27 and the latter is detachably secured to rod 25 by means of nut 33 which is adapted to be tightened upon the threaded end of rod 25 to hold the assembly firmly together.

The method of assembling several batteries by means of the rod arrangement just described is useful upon buoys at sea where the assembly is adapted to be inserted and removed periodically into a compartment especially shaped to receive it. By connecting different numbers of batteries together in series any desired voltage may be obtained.

Fig. 4 illustrates another arrangement in which a plurality of batteries may be connected together in series and inserted in a suitably shaped compartment. In this arrangement the retaining means is in the form of an open frame or cage, comprising spaced upright frame members 35 permanently attached to a bottom plate 36. Frame members 35 are located at the corners of the frame and are angular whereby they cover the corner portions of the batteries. The top end portions 37 of frame members 35 are turned inwardly at right angles and a top member 38, carrying handle 39, is arranged below the portions 37. A close fitting collar member 40 is placed over the top ends of the frame members 35 and holds them in position. Top member 38 and collar member 40 are not attached to the upright frame members 35. The batteries 41 are placed in superposed relation in the frame and are connected together in series by connectors 42 in a manner similar to that described in connection with Fig. 3. The terminal wires 43 and 44 of the assembled unit are connected to terminals 45 and 46 which are mounted on top member 38. When inserting or removing the batteries 41, the collar 40 is removed from the frame and the upright members 35 are spread apart at the top of the frame. The top member 38 is then removed and the batteries are removed or inserted, and the top member may be replaced and the frame members allowed to return to their normal positions and collar 40 replaced.

The angular shape of the battery and of the cage is useful for the purpose of insuring that the batteries are maintained in alignment when they are in the cage or in any angularly shaped container whereby they will not undergo relative twisting or other relative movement which might result in the pulling apart of the inter-battery connection. The corners of the batteries are protected by frame members 35, and this is an advantage since the corners of the batteries receive the most wear and damage in handling and use. While a hexagonal shape is shown it is understood that any suitable angular shape is satisfactory.

Figure 5:
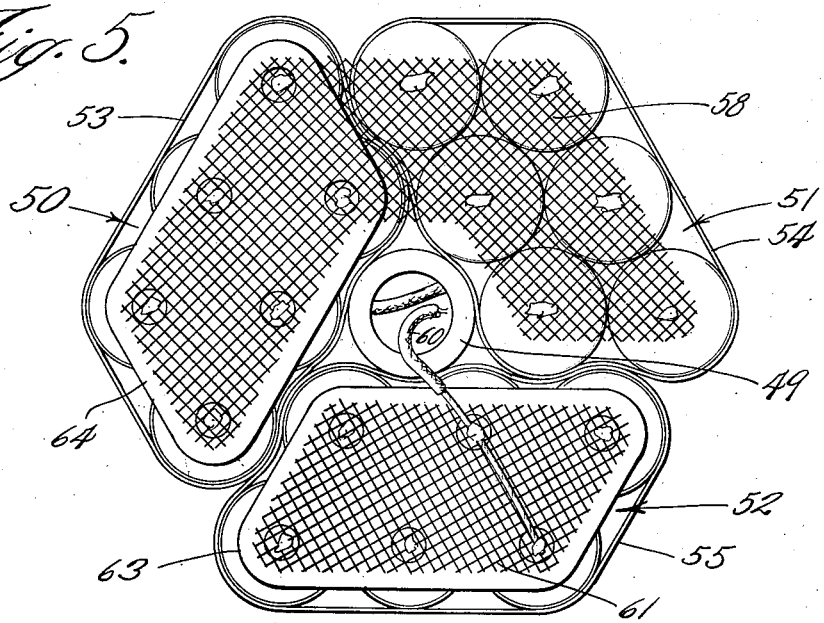
Fig. 5 is a plan view of a modified form of the battery of this invention, with the cover removed.
Figure 6:
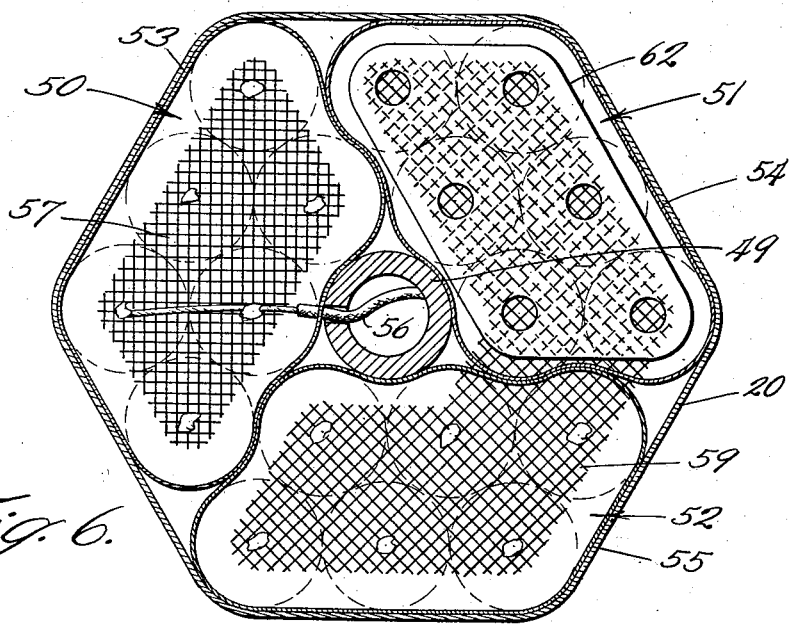
Fig. 6 is a sectional plan view of the battery of Fig. 5 taken at the lower extremities of the cells.

Figs. 5 and 6 illustrate a modification of the battery of this invention in which the parallel connected cells are divided into a number of groups which are connected in series. The cells are arranged about the central tube 49 and are divided into three groups 50, 51 and 52 by means of separators 53, 54 and 55 of paper or other suitable electrical insulating material. The separators are flexible and sufficiently loose that the cells of the different groups may fit together in the close packed arrangement as shown. The cells of group 51 are arranged with their negative terminals toward the top of the battery while groups 50 and 52 have their positive terminals toward the top.

The negative terminals of the cells of group 50 are connected together and to the negative terminal 56 of the battery by means of metal screen 57 at the bottom of the battery. The positive terminals of the cells of group 50 and the negative terminals of the cells of group 51 are connected together by means of metal screen 58 at the top of the battery, as shown in Fig. 5. The positive terminals of group 51 and the negative terminals of group 52 are connected together by means of metal screen 59 at the bottom of the battery, as shown in Fig. 6. The positive terminals of group 52 are connected together and to the positive battery terminal 60 by means of metal screen 61 at the top of the battery, as shown in Fig. 5. A suitably shaped and perforated sheet of insulating material 62 fits over the positive terminals of group 51 and between metal screen 59 and the tops of the cells of group 51 to protect against short circuits as explained heretofore in connection with Figs. 1 and 2. Sheets 63 and 64 are similarly arranged in the other groups of cells.

I claim:

1. A multiple cell battery comprising a container having substantially flat top and bottom members of polygonal shape, said members each having an opening therein, said openings being in substantial alignment with each other, an open-ended tube extending between said members and having the ends thereof coinciding with said openings, a multiplicity of electrically connected cup-shaped, cylindrical dry cells within said container and surrounding said tube, said dry cells having their long axes at right angles to said top and bottom members, and flexible battery terminal leads extending from said container and adapted to be inserted in said tube.

2. A polygonal shaped multi-cell battery comprising a container having substantially flat top and bottom members, said members each having an opening therein, said openings being in substantial alignment with each other, a multiplicity of cup-shaped, cylindrical, electrically connected cells within said container, said cells having their long axes at right angles to said top and bottom members, said cells being connected in parallel and arranged in a plurality of adjacent rows in close packed arrangement, the cans of adjacent cells being substantially in contact with one another, one of said cells in the central part of said battery being omitted, an insulating open-ended tube replacing said omitted cell and extending between said openings in said top and bottom members whereby said battery may be threaded onto a rod, the electrodes of like polarity being electrically connected together, and terminal lead wires extending from said cells and adapted to be inserted into said tube.

3. A multiple unit battery comprising a plurality of electrically connected battery units arranged in superimposed relation, each of said units comprising a container having substantially flat top and bottom members, said members each having an opening therein, said openings being in substantial alignment with each other, a multiplicity of electrically connected dry cells in said container said dry cells being so arranged as to leave unoccupied the space between said openings thereby providing an aperture through the unit and means for holding said units in superimposed relation comprising a frame comprising top and bottom members and a longitudinal member holding said top and bottom members together and holding said battery units against lateral displacement.

4. A multiple unit battery comprising a plurality of electrically connected battery units arranged in superimposed relation, each of said units comprising a container having substantially flat top and bottom members, said members each having an opening therein, said openings being in substantial alignment with each other, a multiplicity of dry cells in said container, said dry cells being arranged so as to leave unoccupied the space between said openings, thereby providing an aperture through the unit, and means for holding said units in superimposed relation comprising a frame comprising top and bottom members and a longitudinal member holding said top and bottom members together, said longitudinal member extending through the apertures of said units to hold said units against lateral displacement.

5. A multiple unit battery comprising a plurality of electrically connected battery units arranged in superimposed relation, each of said units comprising a container having substantially flat top and bottom members, said members each having an opening therein, said openings being in substantial alignment with each other, a multiplicity of dry cells in said container, said dry cells being arranged so as to leave unoccupied the space between said openings, thereby providing an aperture through the unit, and means for holding said units in superimposed relation comprising a frame comprising top and bottom members and a longitudinal member holding said top and bottom members together, said longitudinal member engaging the sides of said units to hold said units against lateral displacement, electrical conductors for connecting said units together and to an external circuit, at least one of said conductors being arranged in the apertures of said units.

CHARLES F. BURGESS.